(No Model.) 4 Sheets—Sheet 1.

D. C. MARKHAM.
MOWING MACHINE.

No. 304,837. Patented Sept. 9, 1884.

WITNESSES:
Fred. G. Dieterich
Jno. G. Hinkel

INVENTOR,
D. C. Markham
by M. A. Doolittle
ATTORNEY.

(No Model.)  4 Sheets—Sheet 2.

D. C. MARKHAM.
MOWING MACHINE.

No. 304,837. Patented Sept. 9, 1884.

WITNESSES:
Fred. G. Dieterich
Jno. G. Hinkel

INVENTOR,
D. C. Markham
By M. H. Doolittle
ATTORNEY.

(No Model.) 4 Sheets—Sheet 3.
D. C. MARKHAM.
MOWING MACHINE.
No. 304,837. Patented Sept. 9, 1884.
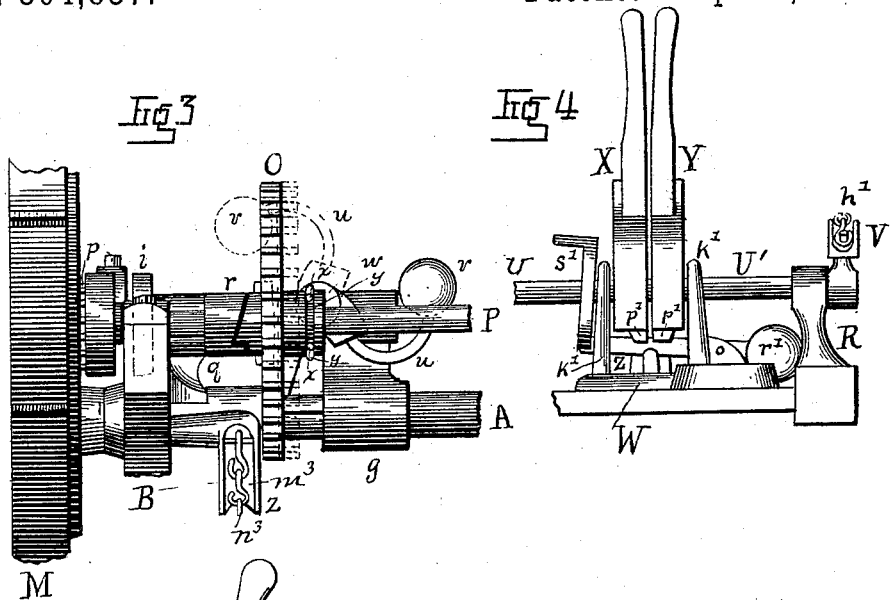
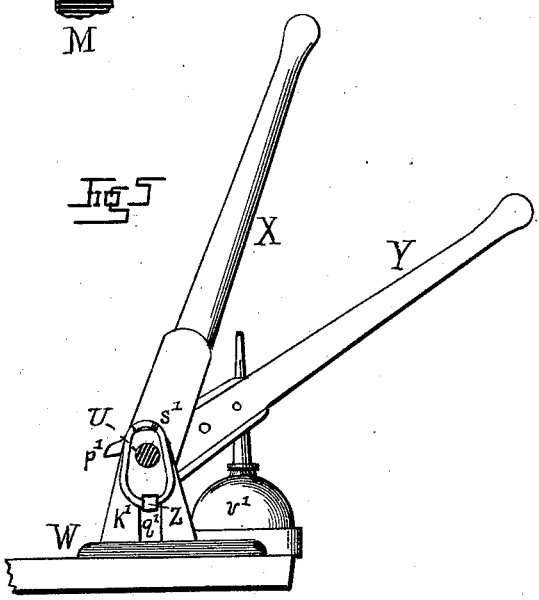
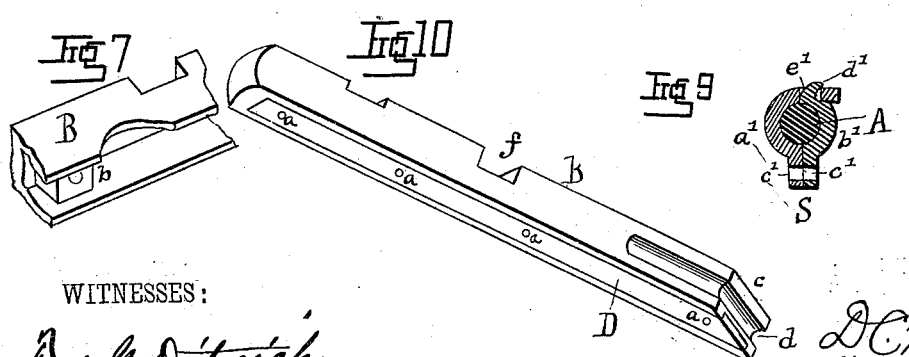
WITNESSES:
Fred G. Dieterich
Jno. G. Hinkel
INVENTOR,
D. C. Markham
By M. H. Doolittle
ATTORNEY.

(No Model.) 4 Sheets—Sheet 4.
D. C. MARKHAM.
MOWING MACHINE
No. 304,837. Patented Sept. 9, 1884.
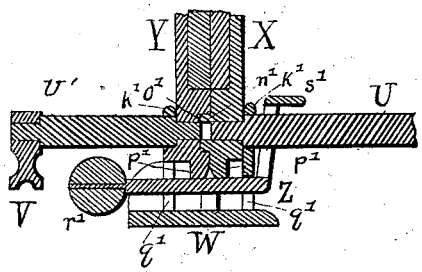
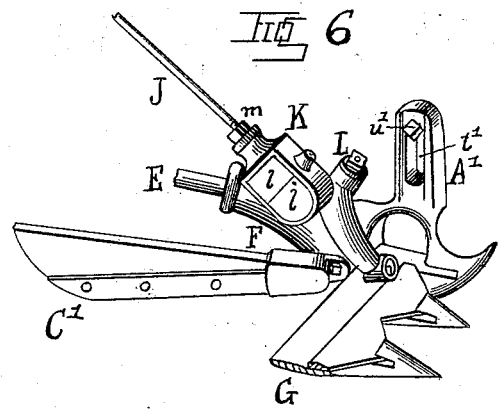
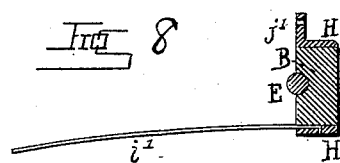
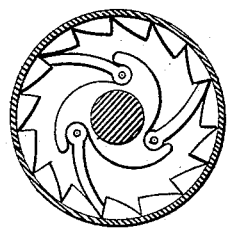
WITNESSES:
Fred. G. Dieterich
Jno. G. Hinkel
INVENTOR,
D. C. Markham
by M. H. Doolittle
ATTORNEY.
N. PETERS. Photo-Lithographer, Washington, D. C.

UNITED STATES PATENT OFFICE.

DEWITT C. MARKHAM, OF TOWANDA, PENNSYLVANIA.

MOWING-MACHINE.

SPECIFICATION forming part of Letters Patent No. 304,837, dated September 9, 1884.

Application filed May 26, 1883. (No model.)

*To all whom it may concern:*

Be it known that I, DEWITT C. MARKHAM, a citizen of the United States, residing at Towanda, in the county of Bradford and State of Pennsylvania, have invented certain new and useful Improvements in Mowing-Machines; and I do hereby declare the following to be a full, clear, and exact description of the invention, such as will enable others skilled in the art to which it appertains to make and use the same.

Figure 1:
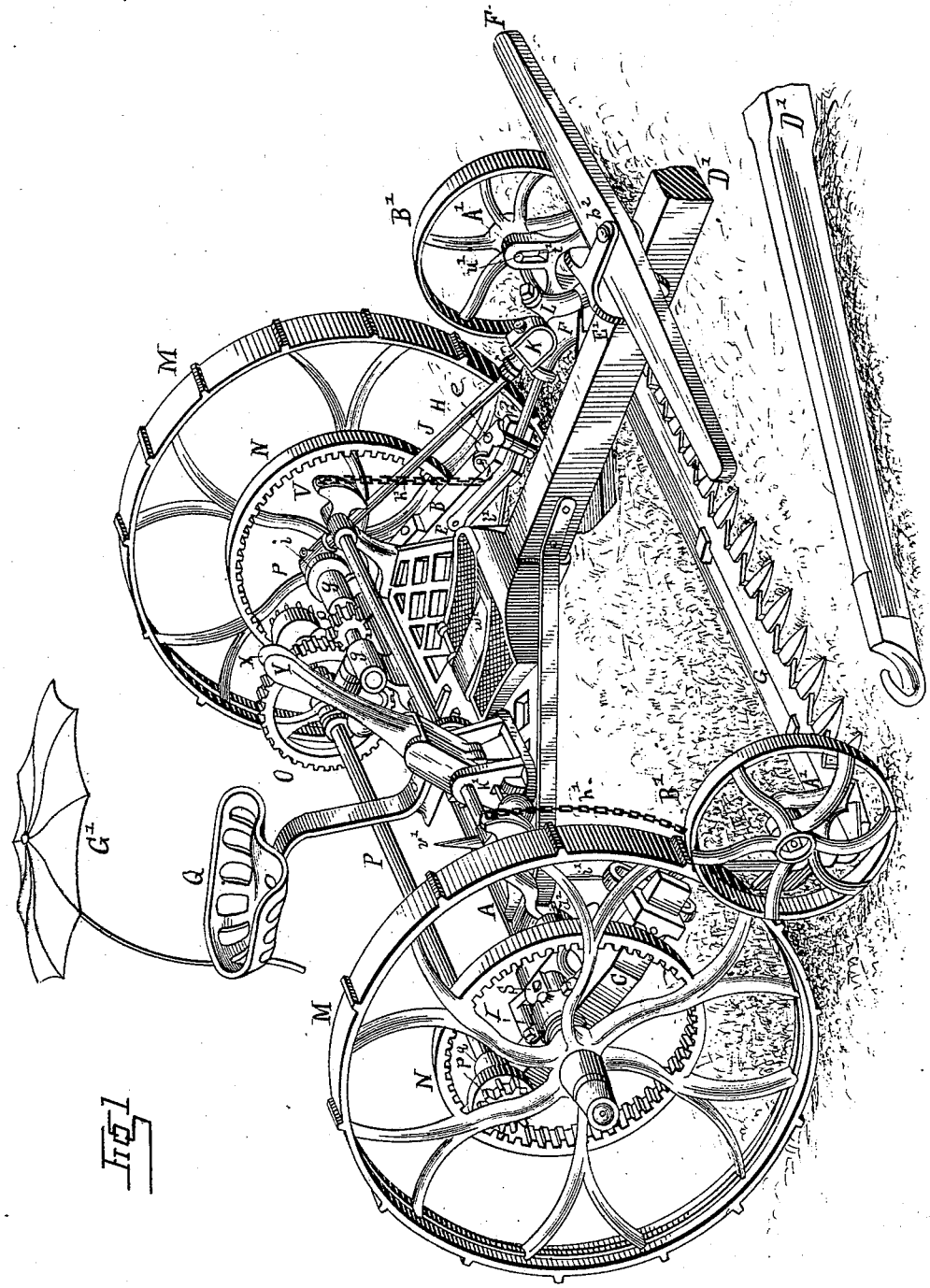
Figure 2:
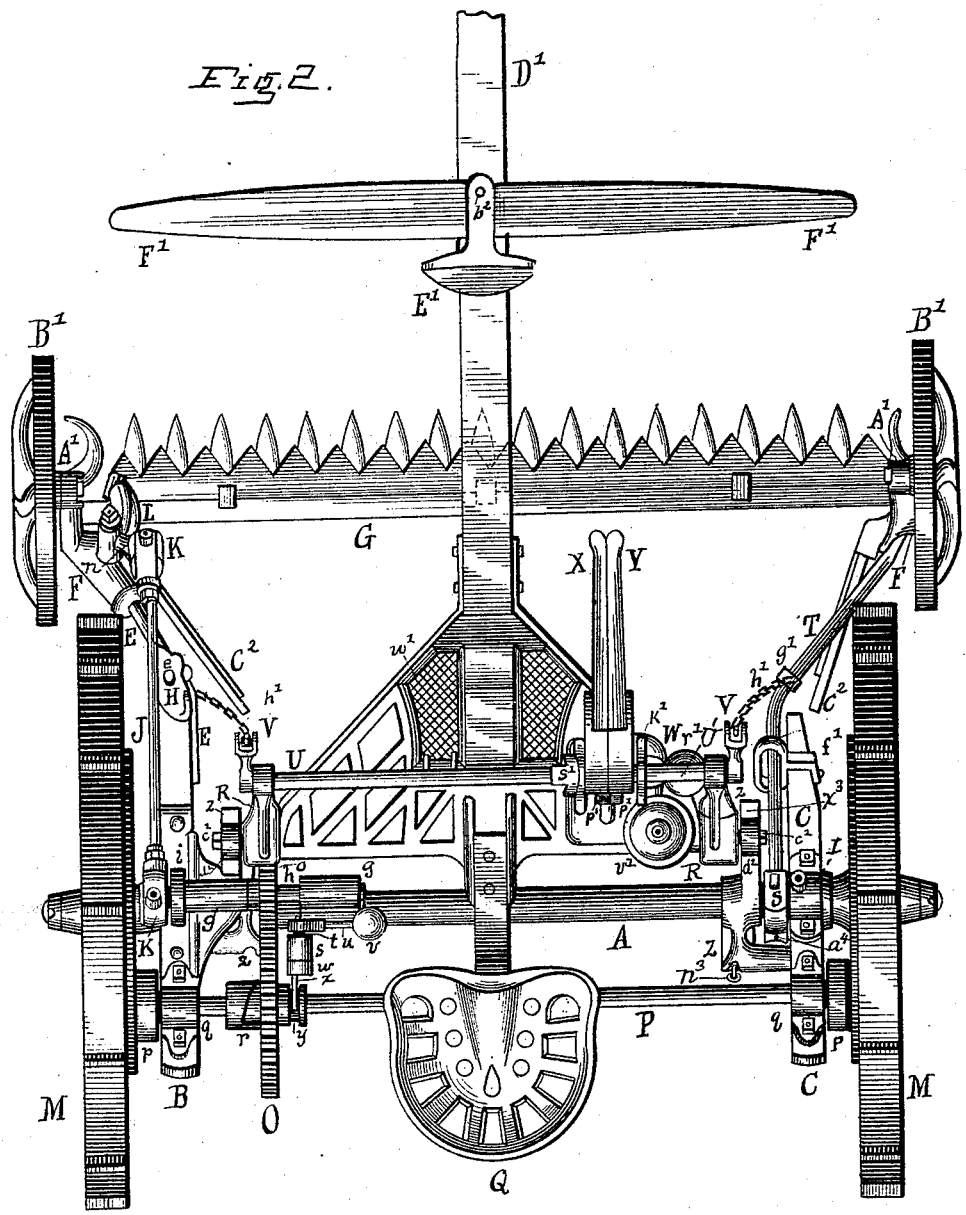

In the accompanying drawings, which illustrate my invention and form part of this specification, Figure 1 is a perspective view of a mower embodying my improvements. Fig. 2 is a plan view of the same. Fig. 3 is a rear view of a portion of the left-hand side of the machine. Fig. 4 is a rear view of the mechanism for lifting the finger-bar. Fig. 5 is a side view of the same. Fig. 6 is a perspective view of the shoe. Fig. 7 is a perspective view of a portion of one of the side arms. Fig. 8 is a view in cross-section of one of the side arms and a clip surrounding it. Fig. 9 is a cross-section of the main axle of the machine, and of a box surrounding said axle. Fig. 10 is a perspective view of one of the side arms. Fig. 11 is a longitudinal section of the mechanism shown in Fig. 4, and Fig. 12 is a view of the ratchet-and-pawl device for controlling the operating mechanism of the cutter-bar.

Like letters designate corresponding parts in all of the figures.

The frame of the mower consists of the axle A and two side arms or rails, B and C, keyed or otherwise rigidly secured to the axle. The side arm B (the left-hand one) is shown in detail in Figs. 7 and 10. This arm may be made either of wood or of metal. In either case it is hollowed out on the under side, as shown in Fig. 7, to render it light, and in the groove so hollowed out is fitted a metal plate, D, which is secured to the arm by screws *a a* screwing into cross-pieces *b b* in the hollowed part. This metal plate serves to cover the hollowed part, and, in case the arm is made of wood, gives it strength. The other side arm, C, may be bored out and strengthened by a metal plate in a similar manner. From the lower extremity of the rail B extends a thrust-rod, E, which connects with the shoe F, to which the finger-bar G is attached. The side arm B at its lower end is beveled, as shown at *c* in Fig. 10, and is formed with a groove, *d*, in which the rod E rests. The groove *d* has a depth equal to one-half the diameter of the rod E. The rod E, at its upper end, is bolted to the arm B, (see Fig. 1,) and is held rigidly in position in the groove *d* by a clip, H, which is secured to the arm by a bolt, *e*.

The main axle-boxes I may be provided with lugs to fit in grooves *f*, formed in the side arms, B C, and be securely bolted thereto; or they may be cast in one piece with the side arms, the object in either case being to have the boxes I, side arms, B C, and axle A rigidly secured to each other. The brackets *g g*, supported on the box I, form bearings for a shaft, *h*, which carries at its outer end a wheel, *i*, furnished with a wrist-pin, *j*, which operates a pitman, J, which conveys motion to the cutter-bar. The head of this pin *j* is held between two parts, *l l*, of a box held by a strap, K, on the end of the pitman J. The pitman J is connected at its lower or forward end to the bell-crank lever L, which reciprocates the cutter-bar by a similar strap, K, inclosing a bearing in two parts, *l l*, which holds the head of a pin, *n*, which forms one arm of the bell-crank lever L, as shown in Fig. 2. The lever L is pivoted to the shoe F.

To the shaft *h*, between the brackets *g g*, is rigidly secured a pinion, *o*, which is revolved by the gear-wheels N N on the driving-wheels M M by means of the intermediate gear-wheel, O, and pinions *p p*. The gear-wheels N N, which are cast with the driving-wheels M M, engage directly with the pinions *p p*, situated respectively on opposite ends of the rear shaft, P, which turns in bearings formed in brackets *q q* on the side arms, B C. The pinions *p p* rotate the shaft P, when the machine is going forward, by means of the ordinary ratchet-and-pawl device shown in Fig. 12, connected with said pinions, but do not rotate the shaft when the machine is going in the opposite direction. The gear-wheel O upon the shaft P, which gears with the pinion *o*, is provided with a clutch, *r*, to enable it to be thrown into and out of action, as desired.

For engaging and disengaging the wheel O,

I provide the shifting mechanism shown in Figs. 2 and 3. A lug, $s$, on the bracket $g$ supports a shaft, $t$, at right angles to the shafts $h$ and P. This shaft $t$ is turned by a lever, $u$, at one end thereof, which is provided with a ball or weighted handle, $v$, placed within convenient reach of the operator. At the other end of the shaft $t$ is a wheel, $w$, provided with a clutch-fork, $x$, placed eccentrically thereon, which engages in a groove, $y$, on the hub of the gear-wheel O. When the lever $u$ is in the position shown by full lines in Fig. 3, the wheel O is rotated by the shaft P by means of the clutch $r$, and when in the position shown by dotted lines, the wheel O is moved to the right, so as to disengage the clutch.

The platform which supports the driver's seat, Q, and the tongue is provided on each side with brackets R R, which extend both upward and forward and downward and backward from the platform. These brackets R R, at their lower and rear extremities, are connected by chains to brackets $z$ $z$, which are rigidly secured to or cast with the side arms, B C. The brackets $z$ $z$ are formed with rearwardly-extending projections $m^3$, which are curved and grooved, and also with curved extensions $x^3$, projecting in a forward and downward direction. The brackets R R are connected to the backward extensions $m^3$, by means of chains $n^3$, which are held in the grooves in said extensions. The platform is formed with a rod or axle, $c^2$, extending out beyond the standards R R, and upon it at each end is a roller, $d^2$, which runs upon the curved extension $x^3$ of the bracket $z$. Between the bracket $z$ and the side arm, C, is a box, S, loosely surrounding the axle A, and turning freely thereon, to which is secured one end of the thumb-rod, T, which connects with a shoe, F, on that side of the finger-bar G.

The box S (shown in section in Fig. 9) is composed, preferably, of two parts, $a'$ $b'$, which are held together at their lower ends by the thrust-rod T passing through holes $c'$ $c'$. The rod T may be retained in the holes $c'$ $c'$ by any suitable means—by a shoulder in front of said holes and by a pin, $a^4$, passing through said rod behind the holes. The parts $a'$ $b'$ are held together at their upper ends by a lip, $d'$, on one part engaging in a hole, $e'$, on the other part. This box S may be made of one piece and slipped on over the axle before the side arm C is put in place, but is preferably made as described, so that if it should be broken it can be replaced without removing the side arm C, which is rigidly secured to the axle. At the lower end of the side arm C is attached a stirrup or slotted guide, $f'$, through which passes the rod T, and which serves to hold the rod in position and at the same time permits it to play within certain limits. This arrangement of the loosely-turning box S connected to the finger-bar by means of the rod T and shoe F renders the vertical movements of the opposite ends of the finger-bar independent of each other.

The rods E and F, connecting the finger-bar G to the side rails B C, are both bent outward in front, as shown in the drawings, so as to permit the length of the finger-bar to be greater than the extreme width of the machine from wheel to wheel, so that the grass which would otherwise be beaten down by the wheels M M may be cut before they pass over it.

To the rod T, at the bend, is attached a clasp, $g'$, to which is fastened a chain, $h'$, which is connected with the lifting device, and to the clasp underneath the rod T is fastened one of the grass-rods $i'$. Another chain, $h'$, connecting with the lifting device on the opposite side of the machine, is fastened to a lug, $j'$, (see Figs. 1 and 8,) on the clip H, which is situated at the bend of the rod E, and to the clip, at its lower side, is attached the other grass-rod $i'$.

The device for lifting the finger-bar from the ground is supported by the platform which supports the driver's seat and the tongue.

The upwardly and forwardly extending parts of the brackets R R form suitable bearings for the outer ends of the shafts U U'. On the outer end of each of these shafts, outside of the standard R, is rigidly secured a sector, V, grooved on its periphery. Each sector, at its highest point, is connected with the chain $h'$, which lies in the groove on the periphery of the sector. When the shafts U U' are turned forward, the sectors are turned down, as shown in Fig. 1, so that the chains hang loosely; but as they are turned backward they turn the sectors upward, first tightening the chains and then lifting them, thus lifting the rods E T, which, being connected with the finger-bar, lift the latter free from the ground.

For turning the lifting-shafts U U', I use the device shown in detail in Figs. 4, 5, and 11. The bracket W, which supports the lifting mechanism, is bolted to the platform, or may be cast in one piece with it. It is constructed with two upwardly-projecting brackets, $k'$ $k'$, in which are bearings for the adjacent ends of the shafts U U', which ends approach each other between the brackets $k'$ $k'$, as shown in Fig. 11. The shaft U is actuated by a lever, X, secured firmly to it, and the other shaft, U', has secured to it a lever, Y, by which it is actuated. These levers X Y work independently of each other, and to keep them in correct relative position to each other without interfering with their action, one, as X, is provided with a circular projection or flange, $n'$, fitting in a circular recess, $o'$, in the other lever, Y, as shown in Fig. 11. When one lever only—say X—is pulled back, only one shaft, U, is turned, and only one end of the finger-bar is raised; or, if it is desired to raise both ends of the finger-bar at once, both levers may be operated together. To keep the levers in any position desired, they are formed with any desirable number of notches $p'$ $p'$ at their lower ends, which ends are circular in shape. The notches engage with a lever-latch, Z, which is pivoted to the bracket W outside of the outer bracket $k'$, as is best shown in Fig. 4. The latch Z passes through slots $q'$ $q'$ in the brackets $k'$ $k'$, and is provided at its outer end with a ball or weight, $r'$, which normally holds the bar raised and engaged with the notches $p'$ $p'$ on the levers, and is at its inner end provided with an upwardly-projecting stirrup or slotted arm, $s'$, embracing the shaft U and forming a suitable rest to be pressed upon by the foot when it is desired to disengage the latch Z from the notches $p'$ $p'$.

The shoes F F, which support the finger-bar, are provided with upwardly-extending standards A' A', which are formed with vertical slots $t'$ $t'$. When the finger-bar is in its proper position for cutting, the shafts $u'$ $u'$ of the lead-wheels B' B' support the finger-bar, the tops of the slots $t'$ $t'$ resting upon the shafts $u'$ $u'$ and forming bearings for them. When the cutter-bar is raised by the lifting device, the shafts $u'$ $u'$ of the lead-wheels drop down in the slots $t'$ $t'$, so that the lead-wheels always rest on the ground, the length of the slots $t'$ $t'$ being sufficient to allow for the maximum height to which the cutter-bar can be raised.

To the shoes F F are fastened swathers $C^2$ $C^2$.

The platform is provided with a suitable recess for the convenient placing of an oil-can, and with a suitable chamber for tools, &c., closed by a hinged cover, $w'$.

The pole D' is provided with a double-tree attachment, E', to prevent the horses stepping on the finger-bar. The bolt $b^2$, which holds the attachment E' on the pole, also serves as the pivot on which the double-tree F' turns.

To the seat Q is attached an umbrella, G', which can be adjusted vertically by a thumb-screw. (Not shown.)

When the entire finger-bar is raised, or the left-hand side only, by means of the lifting mechanism already described, since the connection between the axle and finger-bar is rigid, the axle and all the parts which it supports are moved at the same time. If, now, the platform which supports the driver's seat and the tongue were also rigidly connected with the axle, the whole machine, together with the weight of the driver, would necessarily be moved whenever the finger-bar should be raised, which would involve much labor on the part of the driver and much strain upon the horses. The connection between the platform and the axle, already described, completely overcomes this difficulty, the raising of the finger-bar causing almost no motion to the platform. The platform has two points of support, one point almost directly under the axle, where it is connected by means of the chain $n^3$ to the back part, $m^3$, of the bracket $z$, and the other in front of the axle at the point where the roller $d^2$ bears on the curved face of the forward arm, $x^3$, of the bracket $z$. The weight of the pole and the parts of the platform forward of the bearings of the platform are counterbalanced by the weight of the driver, so that no downward pressure is exerted on the necks of the horses. The double bearings S of the platform allow considerable difference between the weight forward and back of them without bringing any downward pressure upon the horses. The curved surface of the arm $m^3$ of the bracket $z$ is concentric with the axle. When, now, the finger-bar is raised, thus moving backward the parts of the machine connected to the axle, the platform has a forward movement relatively to the rigid parts on the axle, but practically no positive movement, and at the same time the rollers $d^2$ $d^2$ travel forward on the arm $x^3$, which is given such a curvature that the platform always exerts an even pressure upon it. Thus at all times the platform is supported on two bearing-points, and no strain is put upon the horses except the draft of the machine.

I claim as my invention—

1. In a mowing-machine, the side rails grooved on the under side, in combination with metal plates covering said grooves, substantially as and for the purpose set forth.

2. In a mowing-machine, a side rail beveled on its lower extremity and formed with a groove on its inner side, as shown and described, in combination with a bent thrust-rod connecting said side rail and the finger-bar, and adapted to fit in said groove and be held therein, substantially as set forth.

3. A side rail provided with a groove, and a thrust-rod fitting in said groove, in combination with a clip inclosing said side rail and rod and holding them together, substantially as set forth.

4. The box S, constructed in two parts, said two parts being connected by the thrust-rod passing through holes formed in said parts, and secured by suitable means, substantially as described, and by a lip on one part engaging in a hole on the other part, the whole adapted to fit loosely on the axle and turn thereon, substantially as set forth.

5. The combination of the levers X and Y, one provided with a recess and the other provided with a projecting flange adapted to fit in said recess, substantially as described.

In testimony whereof I affix my signature in presence of two witnesses.

DEWITT C. MARKHAM.

Witnesses:
JAMES BRYANT,
W. H. DODGE.